(12) United States Patent
Yao et al.

(10) Patent No.: US 11,499,534 B2
(45) Date of Patent: Nov. 15, 2022

(54) HEAT DISSIPATION SYSTEM, WIND GENERATOR SET AND HEAT DISSIPATION SUPPORTING PLATFORM

(71) Applicant: XINJIANG GOLDWIND SCIENCE & TECHNOLOGY CO., LTD., Urumqi (CN)

(72) Inventors: Zhigang Yao, Beijing (CN); Hongkui Shi, Beijing (CN); Ruiqing Shen, Beijing (CN)

(73) Assignee: XINJIANG GOLDWIND SCIENCE & TECHNOLOGY CO., LTD., Urumqi (CN)

( * ) Notice: Subject to any disclaimer, the term of this patent is extended or adjusted under 35 U.S.C. 154(b) by 88 days.

(21) Appl. No.: 16/965,157

(22) PCT Filed: Oct. 30, 2018

(86) PCT No.: PCT/CN2018/112732
§ 371 (c)(1),
(2) Date: Jul. 27, 2020

(87) PCT Pub. No.: WO2019/223240
PCT Pub. Date: Nov. 28, 2019

(65) Prior Publication Data
US 2021/0048004 A1 Feb. 18, 2021

(30) Foreign Application Priority Data
May 22, 2018 (CN) .......................... 201810496240.3

(51) Int. Cl.
*F03D 80/60* (2016.01)

(52) U.S. Cl.
CPC ........ *F03D 80/60* (2016.05); *F05B 2240/801* (2013.01); *F05B 2250/18* (2013.01); *F05B 2260/20* (2013.01)

(58) Field of Classification Search
CPC ................ F03D 80/60; F05B 2240/801; F05B 2250/18; F05B 2260/20
(Continued)

(56) References Cited

U.S. PATENT DOCUMENTS 8,747,060 B2 * 6/2014 Sabhapathy ............ F03D 80/88
415/175
2010/0109326 A1 5/2010 Sato et al.
(Continued)

FOREIGN PATENT DOCUMENTS

CN 205663578 U 10/2016
CN 205823559 U 12/2016
(Continued)

OTHER PUBLICATIONS

Second Chinese Office Action in corresponding Chinese Application No. 201810496240.3 dated May 20, 2019 (5 pages). Second submission.
(Continued)

*Primary Examiner* — Charles Reid, Jr.
(74) *Attorney, Agent, or Firm* — Bayes PLLC

(57) ABSTRACT

The present disclosure relates to a heat dissipation system, a wind generating set, and a heat dissipation supporting platform. The heat dissipation system includes: a supporting platform, the supporting platform including a body portion, the body portion including an inlet, an outlet, a flow channel communicating the inlet with the outlet, and a mounting position for mounting a functional device, the inlet, the outlet and the flow channel together form a medium circulation passage; and a heat exchange apparatus which communicates with the medium circulation passage and delivers the cooling medium into the medium circulation passage,
(Continued)

the cooling medium flowing through the inlet and the flow channel and flowing out from the outlet to exchange heat with the functional device.

13 Claims, 8 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 2012/0235419 | A1* | 9/2012 | Huang | F03D 9/25 290/55 |
| 2014/0175802 | A1* | 6/2014 | Taniyama | H02K 7/1838 290/55 |
| 2015/0188367 | A1* | 7/2015 | Vander Lind | F03D 1/02 290/55 |

FOREIGN PATENT DOCUMENTS

| | | |
|---|---|---|
| CN | 106640555 A | 5/2017 |
| CN | 106939877 A | 7/2017 |
| CN | 206490546 U | 9/2017 |
| CN | 206555080 U | 10/2017 |
| CN | 107542629 A | 1/2018 |
| EP | 1 921 311 A1 | 5/2008 |
| EP | 2196667 A2 | 6/2010 |
| JP | 2015031200 A | 2/2015 |

OTHER PUBLICATIONS

Australian Office Action in corresponding Australian Application No. 2018424215 dated Apr. 13, 2021 (6 pages).
Extended European Search report in corresponding European Application No. 18920111.4 dated Jan. 22, 2021 (7 pages).
Indian Office Action in corresponding Indian Application No. 202017031503 dated Dec. 28, 2020 (5 pages).
Second Chinese Office Action in corresponding Chinese Application No. 201810496240.3 dated May 20, 2019 (1 page).
International Search Report issued in corresponding International Application No. PCT/CN2018/112732, dated Feb. 21, 2019, 12 pages.
First Office action issued in Chinese Application No. 201810496240. 3, dated Mar. 18, 2019, 7 pages.

* cited by examiner

HEAT DISSIPATION SYSTEM, WIND GENERATOR SET AND HEAT DISSIPATION SUPPORTING PLATFORM

CROSS-REFERENCE TO RELATED APPLICATION

This application is a national phase of International Application No. PCT/CN2018/112732, filed on Oct. 30, 2018, which claims priority to Chinese Patent Application No. 201810496240.3, filed on May 22, 2018. The entire contents of each of the above-identified applications are incorporated herein by reference.

TECHNICAL FIELD

The present disclosure relates to the technical field of wind power, in particular to a heat dissipation system, a wind generator set and a heat dissipation supporting platform.

BACKGROUND

The heat dissipation system can be used to cool the corresponding devices, and thus is widely used. By taking a wind generator set as an example, a heat dissipation system is provided on a nacelle of the wind generator set, and the heat dissipation system can cool the functional devices (such as electrical devices, mechanical devices, and maintenance devices) inside the nacelle, to ensure the safe operation of the wind generator set.

However, the heat dissipation system in the prior art has relatively complicated design structure and high cost in order to play a role in cooling each functional device.

Therefore, there is an urgent need for a novel heat dissipation system, a novel wind generator set and a novel heat dissipation supporting platform.

SUMMARY

Embodiments of the present disclosure provide a heat dissipation system, a wind generator set, and a heat dissipation supporting platform, which can fulfill the cooling effect on the functional devices of wind generators and other equipment, and have simple structure and low cost.

According to one aspect, an embodiment of the present disclosure provides a heat dissipation system, including: a supporting platform, the supporting platform including a body portion, the body portion including an inlet, an outlet, a flow channel communicating the inlet with the outlet, and a mounting position for mounting a functional device, the inlet, the outlet and the flow channel together form a medium circulation passage; and a heat exchange apparatus which communicates with the medium circulation passage and delivers the cooling medium into the medium circulation passage, the cooling medium flowing through the inlet and the flow channel and flowing out from the outlet to exchange heat with the functional device.

According to another aspect, an embodiment of the present disclosure provides a wind generator set, including: a tower; a nacelle provided at an end of the tower in an axial direction, the nacelle including a nacelle cover, a base and a functional device positioned inside the nacelle cover, the base being connected to the tower; the above heat dissipation system, the supporting platform being provided inside the nacelle cover and connected to the base; wherein the functional device is mounted at the mounting position on the supporting platform.

According to a further aspect, an embodiment of the present disclosure provides a supporting platform for use in conjunction with a heat exchange apparatus, the supporting platform includes a body portion, the body portion includes an inlet, an outlet, a flow channel communicating the inlet with the outlet, and a mounting position for mounting a functional device; the inlet, the outlet and the flow channel together form a medium circulation passage; the medium circulation passage is connected to the heat exchange apparatus; and a cooling medium delivered by the heat exchange apparatus flows through the inlet and the flow channel and flows out of the outlet to exchange heat with the functional device.

In the heat dissipation system, the wind generator set and the supporting platform according to the embodiments of the present disclosure, the heat dissipation system includes the supporting platform and the heat exchange apparatus, the supporting platform includes the body portion, and the body portion includes the inlet, the outlet, the flow channel communicating the inlet with the outlet, and the mounting position; the inlet, the outlet and the flow channel together form the medium circulation passage, and the heat exchange apparatus communicates with the medium circulation passage and delivers the cooling medium into the medium circulation passage. When the heat dissipation system is in use, its mounting position may be used to mount different functional devices. Since the heat exchange apparatus communicates with the medium circulation passage, the delivered cooling medium can dissipate heat from the functional device on the supporting platform during the whole process of flowing through the inlet and the flow channel and flowing out of the outlet, such that the heat dissipation system as a whole has simple structure, low cost, and good heat dissipation and cooling effect while supporting the function modules and other devices.

DESCRIPTION OF THE DRAWINGS

The features, advantages, and technical effects of exemplary embodiments of the present disclosure will be described below with reference to the drawings.

Figure 1:
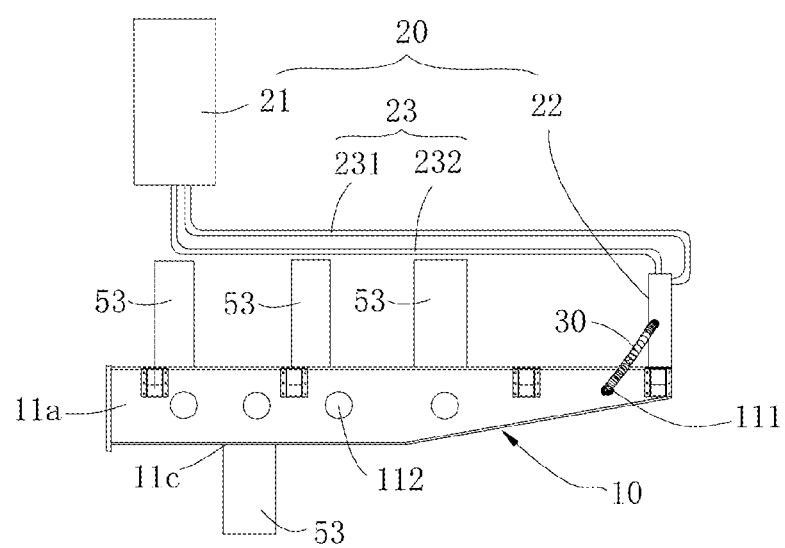
FIG. 1 is a schematic structural view of a heat dissipation system according to an embodiment of the present disclosure.

In which:

X—first direction; Y—second direction; Z—third direction;

10—supporting platform;

11—body portion; 11a—main beam; 11b—reinforcement beam; 11c—mounting position; 111—inlet; 112—outlet; 113—flow channel; 113a—first flow channel; 113b—second flow channel;

12—connection portion;

13—flow control component;

20—heat exchange apparatus;

21—heat exchanger; 22—cold end; 23—pipeline; 231—first heat exchange tube; 232—second heat exchange tube;

30—connection tube;

40—tower;

50—cabin; 51—cabin cover; 52—base; 53—functional device; 54—truss.

DETAILED DESCRIPTION

Features and exemplary embodiments according to various aspects of the present disclosure are described in detail below. In the following detailed description, numerous specific details are set forth, to provide comprehensive understanding of the present disclosure. However, for those skilled in the art, it will be apparent to that the present disclosure may be practiced without some of the specific details. The following description of the embodiments is merely to provide a better understanding of the present disclosure by illustrating examples of the present disclosure. In the drawings and the following description, at least some of the known structures and techniques are not shown, to avoid unnecessarily obscuring the present disclosure. Moreover, for clarity, the size of some of the structures may be enlarged. Further, features, structures, or characteristics described hereinafter may be combined in any suitable manner in one or more embodiments.

The orientation terms appearing in the following description refers to the directions shown in the drawings, and are not intended to limit the specific structures of a heat dissipation system, a wind generator set and a heat dissipation supporting platform in the present disclosure. In the description of the present disclosure, it should also be noted that, unless otherwise explicitly stated and defined, the term "mount" or "connect" shall be understood broadly, for example, it may be fixed connection, or may be detachable connection or integral connection; it may be direct connection, or may be indirect connection. For those skilled in the art, the specific meaning of the above terms in the present disclosure may be understood based on the specific situation.

The heat dissipation system according to the embodiments of the present disclosure can be used to dissipate heat from the functional devices. In addition, the heat dissipation system has simple structure and low cost, and can be widely used in different fields, on the basis of fulfilling the requirements of dissipating heat from the functional devices. Especially in the technical field of wind power, it can better dissipate heat from the functional devices of the wind generator set. In the following embodiments of the present disclosure, the heat dissipation system is described by taking use in the wind generator set as an example, but the heat dissipation system according to the embodiment of the present application is not limited to be applied in the following embodiments, and may also be mounted on equipment in other fields in which the functional devices needs to be cooled and protected.

In order to better understand the present disclosure, the heat dissipation system, the wind generator set and the supporting platform according to the embodiments of the present disclosure will be described in detail below with reference to FIGS. 1 to 8.

Figure 2:
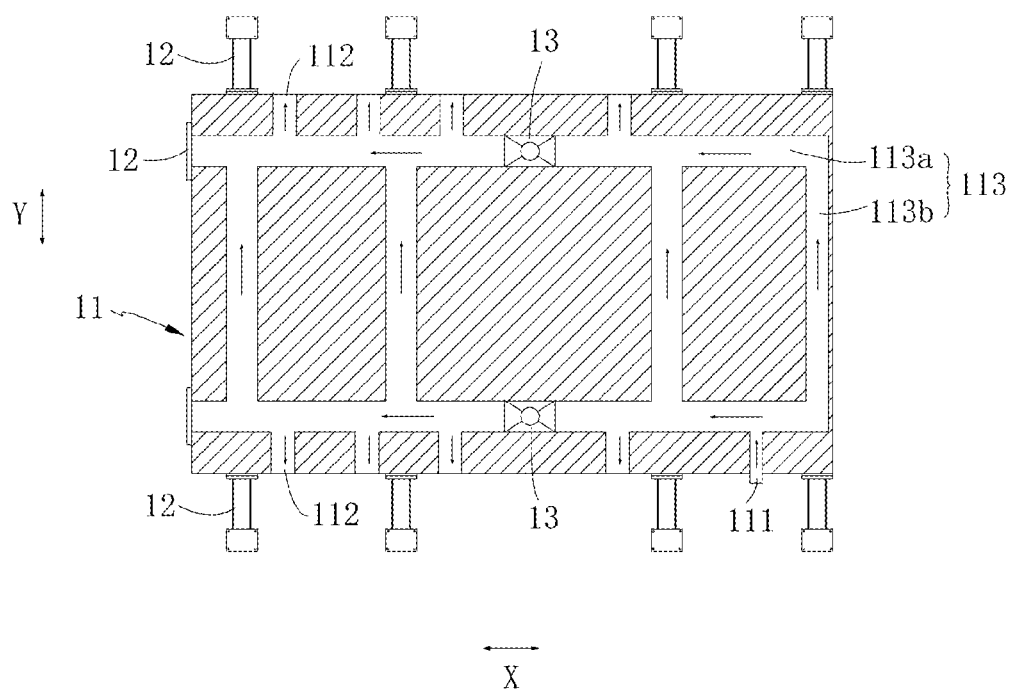
FIG. 2 is a partial cross-sectional view of a supporting platform according to a first embodiment of the present disclosure.

Please with reference to FIGS. 1 and 2, FIG. 1 shows a schematic structural view of the heat dissipation system according to an embodiment of the present disclosure, and FIG. 2 shows a partial cross-sectional view of the supporting platform 10 according to a first embodiment of the present disclosure. As shown in FIGS. 1 and 2, the heat dissipation system according to the embodiment of the present disclosure includes the supporting platform 10 and a heat exchange apparatus 20; the supporting platform 10 includes a body portion 11, and the body portion 11 includes an inlet 111, an outlet 112, a flow channel 113 which communicates the inlet 111 with the outlet 112, and a mounting position 11c at which a functional device 53 can be mounted. The inlet 111, the outlet 112 and the flow channel 113 together form a medium circulation passage. The heat exchange apparatus 20 communicates with the medium circulation passage and delivers a cooling medium into the medium circulation passage. The cooling medium flows through the inlet 111 and the flow channel 113 and flows out from the outlet 112, so as to exchange heat with the functional device 53.

The heat dissipation system according to the embodiment of the present disclosure can fulfill the cooling effect on the functional device 53 of the wind generator set and the like, and has simple structure and low cost.

Specifically, the heat exchange apparatus 20 may adopt different forms of heat exchange structures, as long as the objective of delivering the cooling medium into the supporting platform 10 can be achieved. The cooling medium may be in different fluid form, preferably gas. In an optional embodiment, the heat exchange apparatus 20 includes a heat exchanger 21 and a cold end 22 which communicate with each other through a pipeline 23. The pipeline 23 may include a first heat exchange tube 231 and a second heat exchange tube 232. The medium flowing between the first heat exchange tube 231 and the second heat exchange tube 232 may be gas, and in one example, it may alternatively be liquid. The cooling effect of the heat exchanger 21 on the cold end 22 can be achieved by connecting the heat exchanger 21 and the cold end 22 through the first heat exchange tube 231 and the second heat exchange tube 232.

As an optional implementation, the cold end 22 further includes a recovery medium driving portion, which may recover, to the cold end 22, part or all of the cooling medium flowing out of the outlet 112 of the body portion 11 of the supporting platform 10 to cool the cooling medium, and deliver cooling medium after being cooled back to the medium circulation passage. The medium circulating in the medium circulation passage is preferably gas, and the recovery medium driving portion may be correspondingly a fan. The circulation of gas can be achieved by absorbing other gases in the working environment where the heat dissipation system is located into the cold end 22 by the recovery medium driving portion to perform heat exchange with the cold end 22 and then delivering them to the inlet 111 of the body portion 11. In order to facilitate the connection between the cold end 22 and the inlet 111 of the supporting platform 10, a connection tube 30 may be provided between the cold end 22 and the inlet 111 of the supporting platform 10, so as to better deliver the cooling medium into the medium circulation passage inside the body portion 11.

In specific implementation, the cold end 22 may be fixedly connected to the supporting platform 10, specifically positioned on the body portion 11 of the supporting platform 10, so as to ensure the stability of the cold end 22 while facilitating the flow and recovery of the cooling medium.

Please with reference to FIG. 2, specifically, the supporting platform 10 of the heat dissipation system according to the embodiment of the present disclosure may adopt the supporting platform 10 shown in FIG. 2. The body portion 11 of the supporting platform 10 may have a solid structure in rectangular shape as a whole, the medium circulation passage is provided inside the body portion 11, and meanwhile, the inlet 111 and the outlet 112 which communicates with the medium circulation passage is provided on a side wall of the body portion 11, so that the cooling medium entered via the inlet 111 flows out of the outlet 112 after flowing through the medium circulation passage.

The provision of the mounting position 11c can fulfill the requirements of supporting the functional device 53. In specific implementation, the mounting position 11c may be positioned on an upper surface, a lower surface, or a side surface of the body portion 11. The number of the mounting position may be set according to the functional device 53 to be mounted, and the specific number is not limited. The cooling medium can perform heat exchange with the corresponding position of the body portion 11 during the travel in the medium circulation passage, and then can perform heat exchange with the functional device 53 positioned at the mounting position 11c, so as to achieve heat dissipation and cooling of the functional device 53. Moreover, after the cooling medium is discharged from the outlet 112, it can further perform heat exchange with the functional device 53, so that the heat dissipation and cooling effect of the functional device 53 is better.

As an optional implementation, the flow channel 113 in the body portion 11 may adopt different forms in shape, for example, it may be a whole flow channel in the body portion 11. Apparently, it is preferably in a grid arrangement as a whole. The grid arrangement may include a first flow channel 113a extending in a first direction X and a second flow channel 113b extending in a second direction Y intersecting the first direction X. The first flow channel 113a and the second flow channel 113b intersect to form the grid arrangement. An intersection angle at which the first direction X and the second direction Y intersects may be set as required, preferably 90°, that is, the first flow channel 113a and the second flow channel 113b are perpendicular to each other, and the rectangular grid is formed. Apparently, the intersection angle may be other angles, the correspondingly formed grid may be a trapezoidal grid or a parallelogram grid, such that the inlet 111 and the outlet 112 may communicate with the first flow channel 113a or the second flow channel 113b.

By providing the flow channel 113 in the grid-like arrangement, the number and intersection angle of the first flow channel 113a and the second flow channel 113b may be adjusted according to the functional devices 53 supported on the supporting platform 10, so that the cooling medium delivered by the cold end 22 of the heat dissipation system, after entering the medium circulation channel through the inlet 111, can directly flow through the mounting position 11c where the functional device 53 is located and perform heat exchange with the functional device 53; the cooling effect is good.

Since the cooling medium flowing out of the outlet 112 can also have heat dissipation effect on the functional device 53, as an optional implementation, the number of the outlet 112 is preferably two or more, but the specific number is not limited, and may be set based on the number and position of the mounting position 11c. Two or more outlets 112 includes at least one outlet 112 provided corresponding to the mounting position 11c, such that the cooling medium flowing out of the outlet 112 can directly perform heat exchange with the functional device 53 at the corresponding mounting position 11c, thereby the heat conduction efficiency of the cooling medium flowing out of the outlet 112 can be improved, and the cooling effect of the functional device 53 can be ensured. Meanwhile, the occurrence of too high local temperature or even damage of the functional device 53 can be prevented that is caused by the heat from the functional device 53 not being conducted in time resulting from the cooling medium flowing out of the outlet 112 being in excessive contact with other air or devices in the environment where it is applied, and the cooling effect on the functional device 53 can be better ensured. In specific implementation, preferably, each mounting position 11c of the supporting platform 10 is correspondingly provided at the outlet 112, thereby the heat dissipation and cooling effect of the functional device 53 at each mounting position 11c can be ensured.

Figure 3:
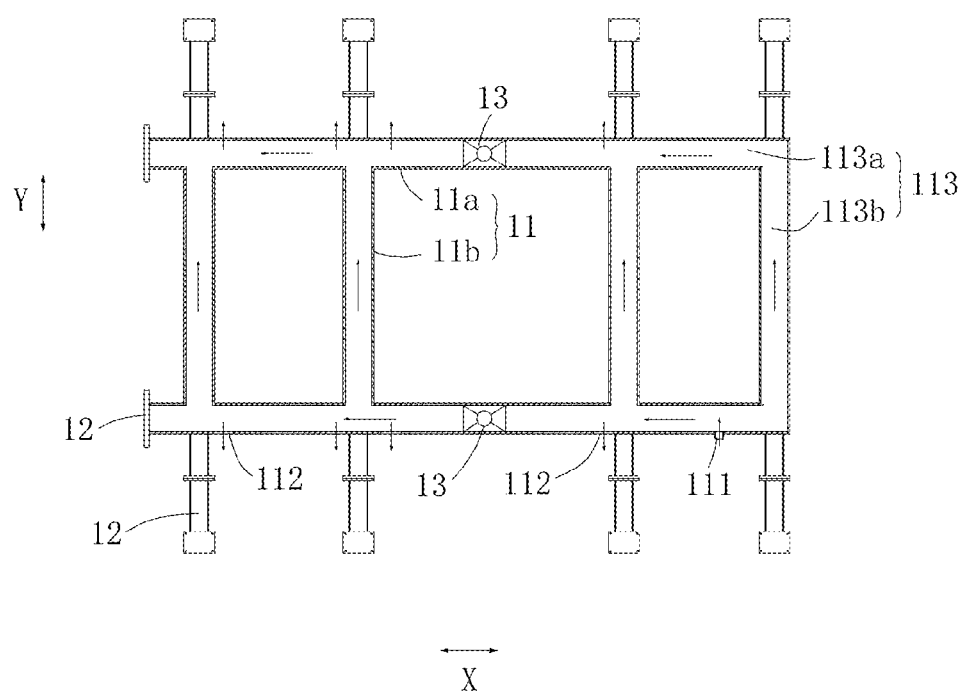
FIG. 3 is a partial cross-sectional view of a supporting platform according to a second embodiment of the present disclosure.

Please with reference to FIG. 3, and FIG. 3 shows a partial cross-sectional view of the supporting platform 10 according to a second embodiment of the present disclosure. It can be understood that the structural form of the body portion 11 of the supporting platform 10 is not limited to the solid structure in rectangular shape as a whole, but may also be a solid structure in a circular shape, an oval shape, and other polygonal shapes. Apparently, the structural form is not limited to these. In some optional embodiments, as shown in FIG. 3, the body portion 11 may preferably include a main beam 11a and a reinforcement beam 11b, the main beam 11a and the reinforcement beam 11b intersect and connects with each other. At least part of the main beam 11a and at least part of the reinforcement beam 11b respectively include a hollow pipe which includes the flow channel 113 and communicate with each other. The inlet 111 and/or the outlet 112 are provided on one of the main beam 11a and the reinforcement beam 11b which include the flow channel 113 respectively.

In this embodiment, the body portion 11 of the supporting platform 10 includes two main beams 11a extending in the first direction X and four reinforcement beams 11b extending in the second direction Y. Each main beam 11a includes the first flow channel 113a extending in the first direction X, each reinforcement beam 11b includes the second flow channel 113b extending in the second direction Y, the first flow channel 113a communicates with the second flow channel 113b. That is, in this embodiment, the main beams 11a and the reinforcement beams 11b of the body portion 11 are all hollow pipes including the flow channel 113. The shape of the cross section of the hollow pipe is not specifically limited, and may be a round pipe, an elliptical pipe, a square pipe, or other polygonal pipe. The first direction X and the second direction Y are preferably perpendicular, that is, the main beam 11a and the reinforcement beam 11b are preferably perpendicular to each other. The positional relationship and arrangement between the first flow channel 113a and the second flow channel 113b may be the same as the implementation shown in FIG. 2 and the variations thereof. The variation may be achieved by changing the number of the main beam 11a and the reinforcement beam 11b and the intersection angle between the two, and will not be repeated here.

The body portion 11 of the supporting platform 10 according to this embodiment of the present disclosure adopts the form in which the main beam 11a and the reinforcement beam 11b intersect and connect with each other. Therefore, on the base that the support strength requirements of the supporting platform 10 to the functional device 53 can be ensured, the materials used for the supporting platform 10 can be reduced, thereby the weight and cost of the supporting platform 10 and the heat dissipation system can be lowered. Meanwhile, in this form of supporting platform 10, during the process of the cooling medium flowing from inlet 111 through the flow channel 113 and flowing out of the outlet 112, the external structure which performs heat transfer with the cooling medium can be reduced, and energy dissipation can be decreased, so that the change in temperature of the cooling medium that reaches the position where the functional device 53 is located and performs heat exchange with the functional device 53 can be smaller, thereby the cooling effect can be ensured better.

In an optional embodiment, the main beam 11a and the reinforcement beam 11b may be made of closed box-type beams and communicate with each other. Therefore, the body portion 11 of the supporting platform 10 has good stress and high rigidity, is easy to be processed and manufactured, and further saves materials. Since the box-type beam is hollow inside, it can be understood that it also belongs to the above defined hollow pipe.

As an optional implementation, the main beam 11a may be used as the main load-bearing member of the supporting platform 10. At this time, the mounting position 11c of the supporting platform 10 is preferably positioned on the main beam 11a. Therefore, in order to better dissipate heat from the functional device 53 at the mounting position 11c, as an optional implementation, the two or more outlets 112 may be provided on the main beam 11a and may be arranged at intervals along the extending direction (i.e., the first direction X) of the main beam 11a. The two or more outlets 112 may be arranged on the same straight line, apparently, they are not limited to be arranged on one straight line, they may be arranged in a staggered manner, as long as the heat exchange with the functional device 53 can be performed and the cooling effect on the functional device 53 can be fulfilled. Apparently, the outlets 112 are all preferably provided on the main beam 11a, but they are not limited to this, they may also be provided on reinforcement beams 11b, or the outlets 112 are provided on both the main beams 11a and the reinforcement beams 11b.

As an optional implementation, on the basis of fulfilling the requirements of supporting and cooling the functional device 53, optionally, as shown in FIG. 1, the cross section of one of end portions of the main beam 11a in the extending direction has a decreasing tendency along the extending direction, in order to further reduce the weight of the supporting platform 10 and reduce the cost.

It can be understood that the body portion 11 of the supporting platform 10 is not limited to the form of the embodiment shown in FIG. 3, and in some other embodiments, the number and structural form of the main beam 11a and the reinforcement beam 11b may be adjusted, as long as the functional requirements of the heat dissipation system to the supporting platform 10 can be fulfilled, for example, the following different forms may also be adopted.

Figure 4:
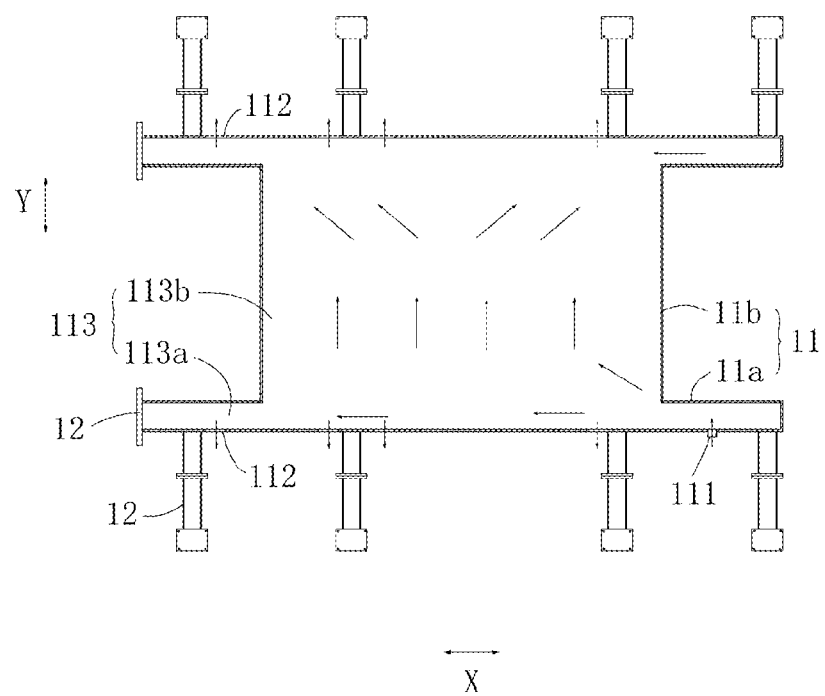
FIG. 4 is a partial cross-sectional view of a supporting platform according to a third embodiment of the present disclosure.

Please with reference to FIG. 4, and FIG. 4 is a partial cross-sectional view of the supporting platform 10 according to a third embodiment of the present disclosure. This embodiment is substantially the same as the implementation of the embodiment shown in FIG. 3, except that the number of reinforcement beams 11b in this embodiment of the present disclosure is one, and an extension width in the first direction X is wider than that in the embodiment shown in FIG. 3. Likewise, the requirements of supporting and cooling the functional device 53 can be fulfilled.

Figure 5:
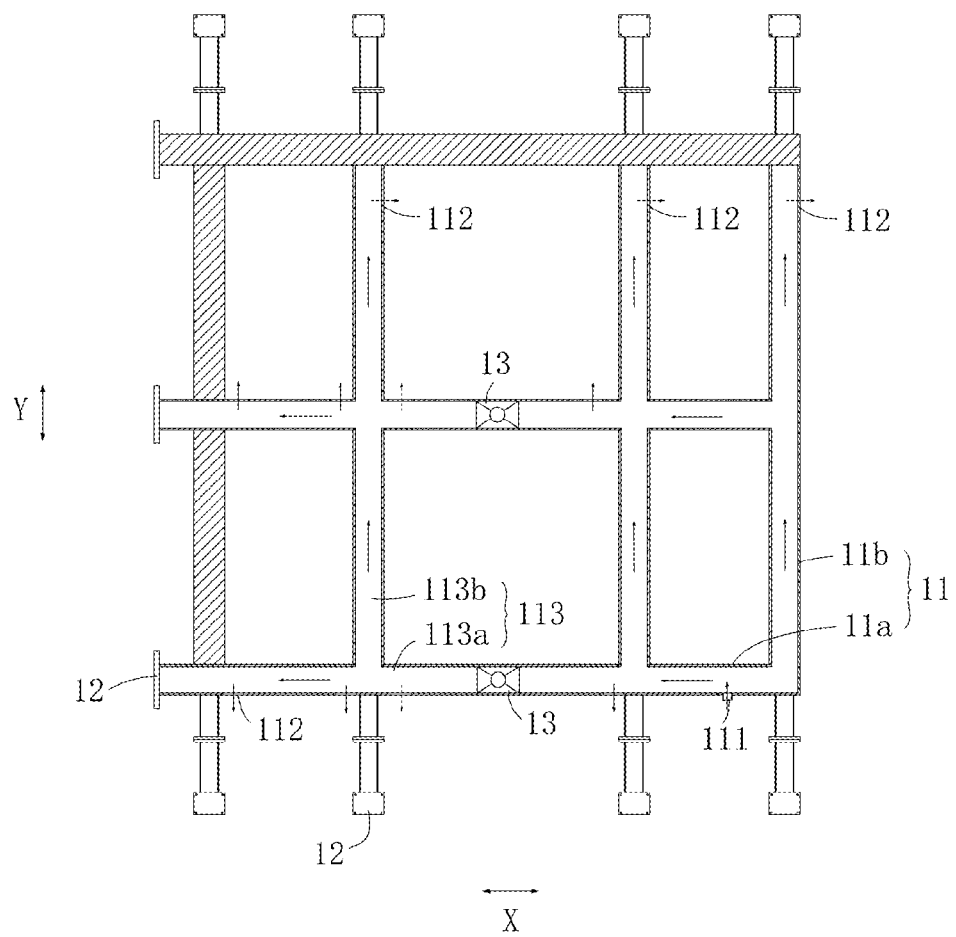
FIG. 5 is a partial cross-sectional view of a supporting platform according to a fourth embodiment of the present disclosure.

Please with reference to FIG. 5, and FIG. 5 is a partial cross-sectional view of the supporting platform 10 according to a fourth embodiment of the present disclosure. The implementation of the embodiment shown in FIG. 5 is substantially the same as the implementation of the embodiment shown in FIG. 3, except that the number of main beams 11a in this embodiment of the present disclosure is three, and the number of reinforcement beams 11b is eight; meanwhile, not all of the main beams 11a and the reinforcement beams 11b are hollow pipes including the flow channel 113, one of the three main beams 11a is a solid rod, while two of the eight reinforcement beams 11b are solid rods, and the remaining main pipes 11a and reinforcement beams 11b, which are hollow pipes including the flow channel 113, communicate with each other. Likewise, the requirements of supporting and cooling the functional device 53 can be fulfilled.

Figure 6:
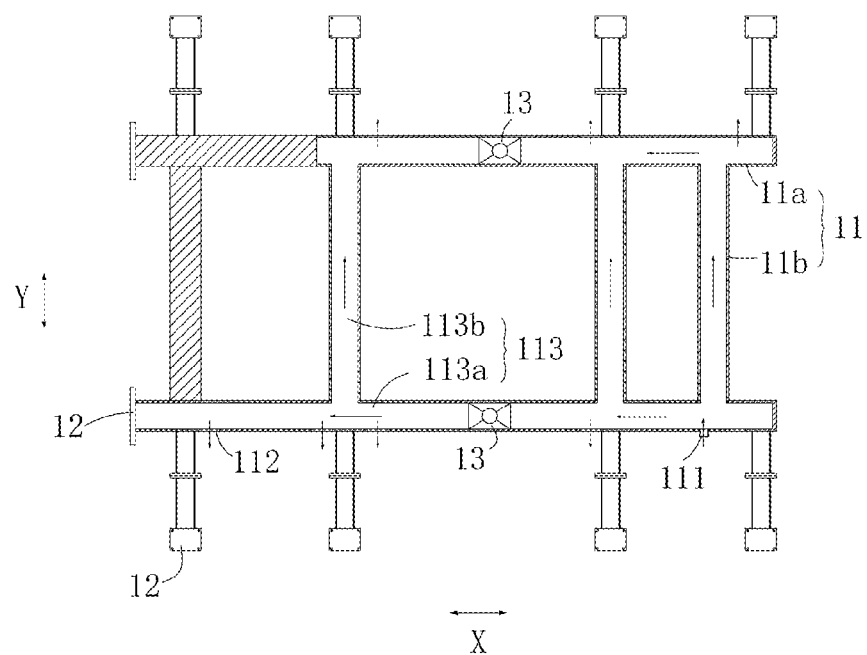
FIG. 6 is a partial cross-sectional view of a supporting platform according to a fifth embodiment of the present disclosure.

Please with reference to FIG. 6, and FIG. 6 shows a partial cross-sectional view of the supporting platform 10 according to a fifth embodiment of the present disclosure. The implementation of the embodiment shown in FIG. 6 is substantially the same as the implementation of the embodiment shown in FIG. 3, except that one of the four reinforcement beams 11b in this embodiment of the present disclosure is a solid rod; one part of one of the two main beams 11a in its extending direction is a solid rod while the other part is the hollow pipe including flow channel 113; the one part of the main beam 11a which is the hollow pipe communicates with the remaining main beams 11a and the reinforcement beams 11b which include the flow channel 113 each other. Likewise, the requirements of supporting and cooling the functional device 53 can be fulfilled.

Figure 7:
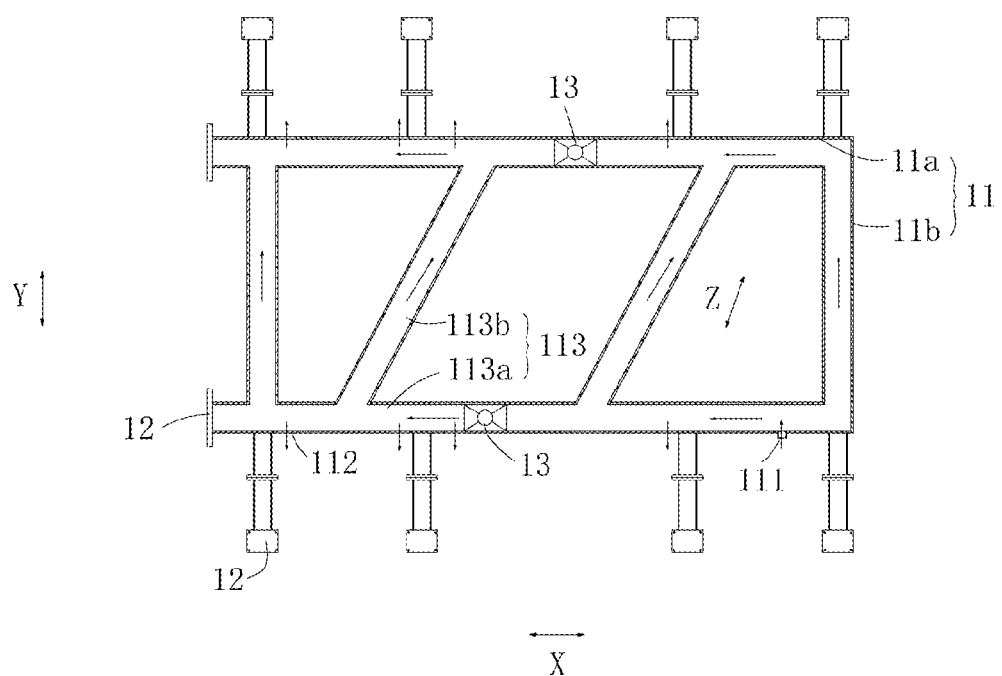
FIG. 7 is a partial cross-sectional view of the supporting platform according to a sixth embodiment of the present disclosure.

Please with reference to FIG. 7, FIG. 7 shows a partial cross-sectional view of the supporting platform 10 according to a sixth embodiment of the present disclosure. The implementation of the embodiment shown in FIG. 7 is substantially the same as the implementation of the embodiment shown in FIG. 3, except that the four reinforcement beams 11b include two reinforcement beams 11b extending in the second direction Y and two reinforcement beams 11b extending in a third direction Z. Likewise, the requirements of supporting and cooling the functional device 53 can be fulfilled. Optionally, in specific implementation, the four reinforcement beams 11b may all extend in the third direction Z, that is, the main beam 11a and the reinforcement beam 11b are not limited to be perpendicular, and the intersection angle between the two may be other angle degrees.

It can be seen from the above example that, when the body portion 11 of the supporting platform 10 adopts the combination form of the main beam 11a and the reinforcement beam 11b, the number of the main beam 11a and the reinforcement beam 11b, and the intersection angle between the extending direction of the two, etc. are not limited, and may be adjusted as required. Meanwhile, the at least part of the main beam 11a may be either at least one main beam 11a among the two or more main beams 11a, or a part of any one main beam 11a in its extending direction. Similarly, the at least part of the reinforcement beam 11b may be either at least one reinforcement beam 11b among the two or more reinforcement beams 11b, or a part of any one reinforcement beam 11b in its extending direction.

The supporting platform 10 mentioned in the above embodiments, when used (for example, when applied to the wind generator set), needs to be connected with other components in the environment where it is applied. Therefore, as an optional implementation, the supporting platform 10 according to the embodiments of the present disclosure further includes a connection portion 12 which is connected to the body portion 11. When the body portion 11 adopts the solid structure, the connection portion 12 may be connected to a side surface of the body portion 11. When the body portion 11 adopts the combination form of the main beam 11a and the reinforcement beam 11b, the connection portion 12 may be connected to the main beam 11a and/or the reinforcement beam 11b of the body portion 11, according to the requirements of the application environment of the heat dissipation system and the like.

In specific implementation, the connection portion 12 may be a connection flange or a connection seat. The connection seat refers to a seat structure including two or more connection ends, one of the connection ends is connected to the body portion 11, while the other of the connection ends is connected to other components (such as a truss of a nacelle of the wind generator set), as long as the connection and mounting requirements of the heat dissipation system in application environment can be fulfilled.

As an optional implementation, the supporting platform 10 in the above embodiments further includes a flow control component 13, which is provided in the flow channel 113 to control a flow rate of the cooling medium in the flow channel 113.

Optionally, the flow control component 13 may be a control valve, and the number and type of the flow control component 13 are not specifically limited. For example, when the medium circulation passage includes the first flow channel 113a and the second flow channel that are provided to be intersected, the flow control component 13 may be provided only in the first flow channel 113a. Apparently, the flow control components 13 may also be provided in both the first flow channel 113a and the second flow channel 113b for controlling the flow rate of the cooling medium in the corresponding flow channel 113. When the flow rate of the cooling medium is zero, the corresponding first flow channel 113a or the second flow channel 113b is closed.

By providing the flow control component 13, the flow rate of the cooling medium can be adjusted according to the heat dissipation and cooling requirements of the functional device 53 at the corresponding mounting position 11c of the supporting platform 10. When the heat dissipation temperature of the functional device 53 is high, the flow rate in the corresponding flow channel 113 is relatively high; when the heat dissipation temperature of the functional device 53 is low, the flow rate in the corresponding flow channel 113 is relatively low; when the functional device 53 does not need to be cooled, the flow rate of the corresponding flow channel 113 can be controlled to zero. The cooling medium can be reasonably distributed, so that the heat dissipation system can more optimize the heat dissipation effect in the application environment, and the heat dissipation system can be applied in and fulfill different usage environments.

Therefore, the supporting platform 10 according to the embodiments of the present disclosure has the inlet 111, the outlet 112, the flow channel 113 which communicates the inlet 111 with the outlet 112, and the mounting position 11c; the inlet 111, the outlet 112, and the flow channel 113 together form the medium circulation passage; the heat exchange apparatus 20 communicates with the medium circulation passage and delivers the cooling medium into the medium circulation passage. When in use, the mounting position 11c may be used to mount different functional devices 53 to provide a supporting function. Meanwhile, the cooling medium can dissipate heat from the functional device 53 on the supporting platform 10 during the whole process of flowing through the inlet 111 and the flow channel 113 and flowing out of the outlet 112, such that the heat dissipation system as a whole has simple structure, low cost, and good cooling effect. That is, the supporting platform 10 according to the embodiments of the present disclosure has the functions of supporting, guiding and cooling. The provision of the connection portion 12 can better fulfill the connection between the supporting platform 10 and other components in the application environment, thereby achieving better practicability. The provision of the flow control component 13 makes the heat dissipation and cooling effect of the supporting platform 10 more optimal.

The heat dissipation system according to the embodiments of the present disclosure includes the supporting platform 10 in any of the above embodiments and the heat exchange apparatus 20. The heat exchange apparatus 20 can provide the cooling medium for the supporting platform 10. The two can be used in conjunction with each other, thus all the advantages of the supporting platform 10 is not only involved, but also the supporting platform 10 provides the medium circulation passage in which the cooling medium flows and dissipates heat from the functional device 53, so that the heat exchange apparatus 20 can achieve the cooling of the cooling medium, without providing more pipelines 23 to guide the cooling medium. The entire heat dissipation system can be simplified, and the occupied space and cost of the heat dissipation system can be further reduced, on the basis that the requirements of supporting and cooling the functional device 53 can be ensured.

Figure 8:
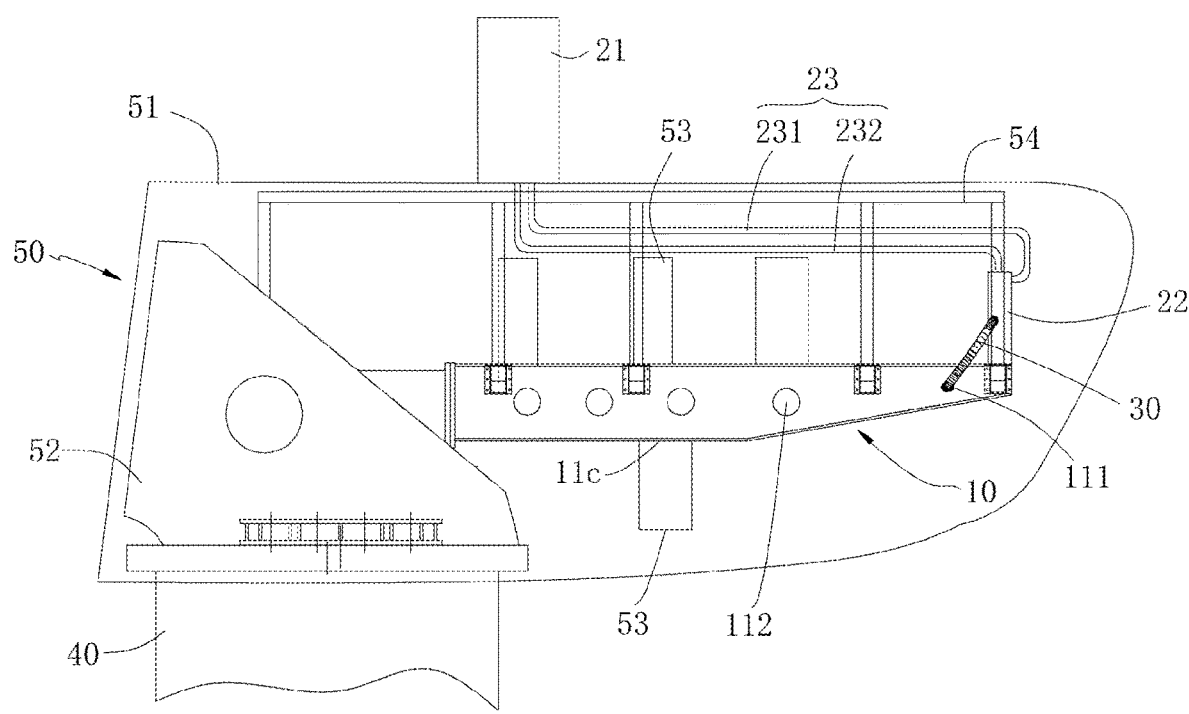
FIG. 8 is a schematic structural view of a wind generator set according to an embodiment of the present disclosure.

Please with reference to FIG. 8 together, and FIG. 8 shows a schematic structural view of the wind generator set according to an embodiment of the present disclosure. As shown in FIG. 8, the embodiment of the present disclosure provides the wind generator set. The wind generator set includes a tower 40, a nacelle 50 and a heat dissipation system. The nacelle 50 is provided at an end of the tower 40 in its axial direction. The nacelle 50 includes a nacelle cover 51, a base 52 and the functional device 53 positioned inside the nacelle cover 51. The base 52 is connected to the tower 40, and the supporting platform 10 is provided inside the nacelle cover 51 and connected to the base 52, wherein the functional device 53 is mounted at the mounting position 11c on the supporting platform 10.

In the specific implementation of the wind generator set in the embodiment of the present disclosure, the heat exchange apparatus 20 of the heat dissipation system may be provided at different positions of the wind generator set, as long as the requirement of delivering the cooling medium to the supporting platform 10 can be fulfilled. Apparently, in an optional embodiment, the cold end 22 of the heat exchange apparatus 20 is directly provided on the supporting platform 10, thus the heat loss of the cooling medium during the flow process can be reduced, and the cooling effect on the functional device 53 can be ensured. The heat exchanger 21 is preferably provided outside the nacelle cover 51, thus the space occupied by the heat dissipation system inside the nacelle cover 51 can be minimized, and the overall size of the nacelle cover 51 can be reduced, while cost can be reduced and transport can be facilitated without being limited by the size of ground transport size, on the basis that the requirements of the heat dissipation system can be fulfilled.

The base 52 may be rotatably connected to the tower 40 by rotary components such as rotary bearings, so as to better fulfill the yaw requirements of the wind generator set. When the supporting platform 10 includes the connection portion 12, the supporting platform 10 may be connected to the base 52 by the connection portion 12, and the connection portion 12 connected to the base 52 may be in the form of a flange, which has a simple structure and can ensure connection strength and connection convenience between the two. The functional device 53 is at least one of an electrical device, a mechanical device, and a maintenance device.

Moreover, in order to better support the nacelle cover 51, as an optional implementation, a truss 54 is further provided inside the nacelle cover 51, and the nacelle cover 51 is connected to the supporting platform 10 by the truss 54. When the supporting platform 10 includes the connection portion 12, the truss 54 may be specifically connected to the connection portion 12 of the supporting platform 10, and the connection portion 12 connected to the truss 54 may be in the form of a connection seat, which can also ensure that the connection strength and connection convenience between the connection portion 12 and the truss 54.

Therefore, the wind generator set according to the embodiment of the present disclosure includes the heat dissipation system in any of the above embodiments, therefore, it can better fulfill the requirements of supporting and cooling the functional device 53, and can greatly reduce the task and time of the overall layout, design, connection, support, mounting, assembly, lifting and other aspects of the wind generator set itself, and thus, has higher application value and is easy to promote.

Although the present disclosure has been described with reference to the preferred embodiments, various improvements can be made and components therein can be replaced with equivalents without departing from the gist of the present disclosure. In particular, as long as there is no structural conflict, the technical features mentioned in the various embodiments can be combined in any manner. The present disclosure is not limited to the specific embodiments disclosed herein, but includes all technical solutions falling within the scope of the claims.

What is claimed is:

1. A heat dissipation system, comprising:
   a supporting platform comprising a body portion, the body portion comprising an inlet, a plurality of outlets, a flow channel communicating the inlet with the plurality of outlets, and a mounting position for mounting a functional device, the inlet, the plurality of outlets and the flow channel together forming a medium circulation passage, wherein the body portion comprises a main beam and a reinforcement beam, the main beam and the reinforcement beam intersect and connect with each other, the plurality of outlets are provided on the main beam and are arranged at intervals in an extending direction of the main beam, and a cross section of one of the end portions of the main beam in the extending direction has a decreasing tendency along the extending direction; and
   a heat exchange apparatus which communicates with the medium circulation passage and delivers a cooling medium into the medium circulation passage, the cooling medium flowing through the inlet and the flow channel and flowing out of the outlet to exchange heat with the functional device.

2. The heat dissipation system according to claim 1, wherein least one of the plurality of outlets is provided corresponding to the mounting position.

3. The heat dissipation system according to claim 1, wherein the flow channel is arranged in a grid shape as a whole.

4. The heat dissipation system according to claim 1, wherein:
   at least part of the main beam and at least part of the reinforcement beam respectively comprise a hollow pipe which comprises the flow channel and communicate with each other, and the inlet and/or the plurality of outlets are provided on one of the main beam and the reinforcement beam which comprise the flow channel respectively.

5. The heat dissipation system according to claim 4, wherein the main beam and the reinforcement beam are both made of closed box-type beams and communicate with each other.

6. The heat dissipation system according to claim 4, wherein the supporting platform further comprises a connection portion, the connection portion is provided on the body portion, and the connection portion is a flange or a connection seat.

7. The heat dissipation system according to claim 1, wherein the heat exchange apparatus comprises a heat exchanger and a cold end which communicate with each other through a pipeline, and the cold end is fixedly connected to the supporting platform.

8. The heat dissipation system according to claim 1, wherein the cold end comprises a recovery medium driving portion which is capable of recovering, to the cold end, part or all of the cooling medium flowing out of the plurality of outlets to cool the cooling medium, and delivering the cooling medium after being cooled back to the medium circulation passage.

9. The heat dissipation system according to claim 1, wherein the supporting platform further comprises a flow control component, and the flow control component is provided inside the flow channel to control a flow rate of the cooling medium in the flow channel.

10. A wind generator set, comprising:
    a tower;
    a nacelle provided at an end of the tower in an axial direction, the nacelle comprising a nacelle cover, a base and a functional device positioned inside the nacelle cover, the base being connected to the tower; and
    the heat dissipation system according to claim 1, the supporting platform being provided inside the nacelle cover and connected to the base,
    wherein the functional device is mounted at the mounting position on the supporting platform.

11. The wind generator set according to claim 10, wherein the functional device comprises at least one of an electrical device, a mechanical device, and a maintenance device, and a truss is further provided inside the nacelle cover, and the nacelle cover is connected to the supporting platform by the truss.

12. A supporting platform for use in conjunction with a heat exchange apparatus, the supporting platform comprising a body portion, the body portion comprising an inlet, a plurality of outlets, a flow channel communicating the inlet with the plurality of outlets, and a mounting position for mounting a functional device; the inlet, the plurality of outlets and the flow channel together forming a medium circulation passage, the medium circulation passage being connected to the heat exchange apparatus, and a cooling medium delivered by the heat exchange apparatus flowing through the inlet and the flow channel and flowing out of the plurality of outlets to exchange heat with the functional device, wherein the body portion comprises a main beam and a reinforcement beam, the main beam and the reinforcement beam intersect and connect with each other, the plurality of outlets are provided on the main beam and are arranged at intervals in an extending direction of the main beam, and a cross section of one of the end portions of the main beam in the extending direction has a decreasing tendency along the extending direction.

13. The supporting platform according to claim 12, wherein the supporting platform further comprises a flow control component, and the flow control component is provided inside the flow channel to control a flow rate of the cooling medium in the flow channel.

* * * * *